Sept. 23, 1952 E. W. ASHTON 2,611,200
POULTRY TAG
Filed April 21, 1950 2 SHEETS—SHEET 1
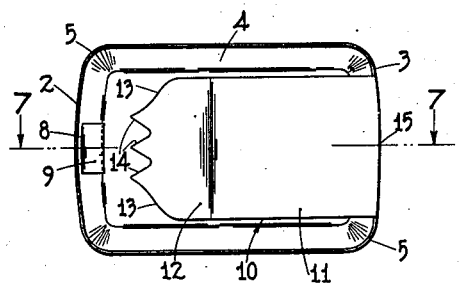
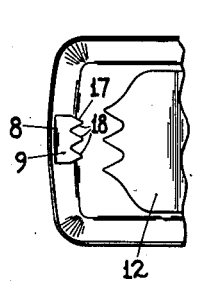
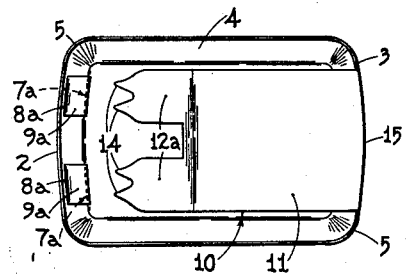
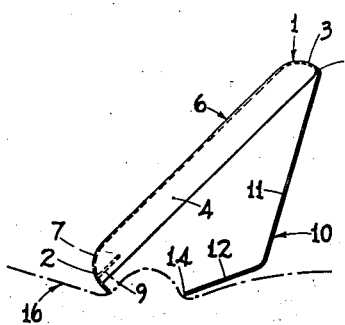
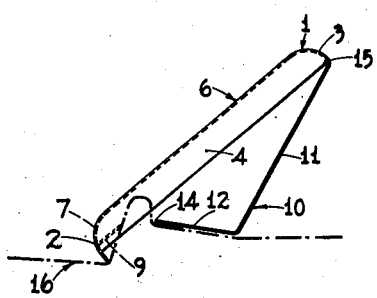
Inventor
E. W. Ashton
By Hoseack Downing Seebold
Attys.

Sept. 23, 1952 E. W. ASHTON 2,611,200
POULTRY TAG
Filed April 21, 1950 2 SHEETS—SHEET 2
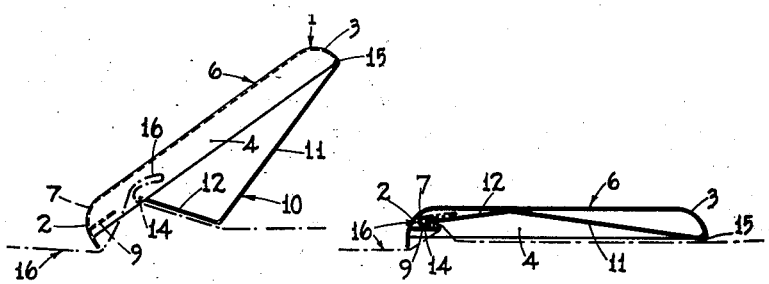
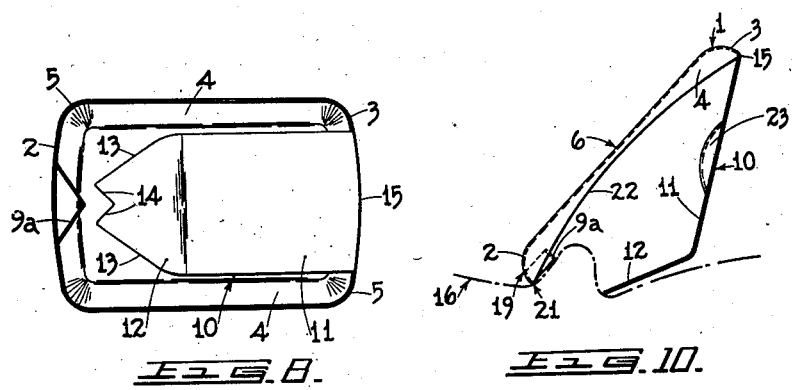
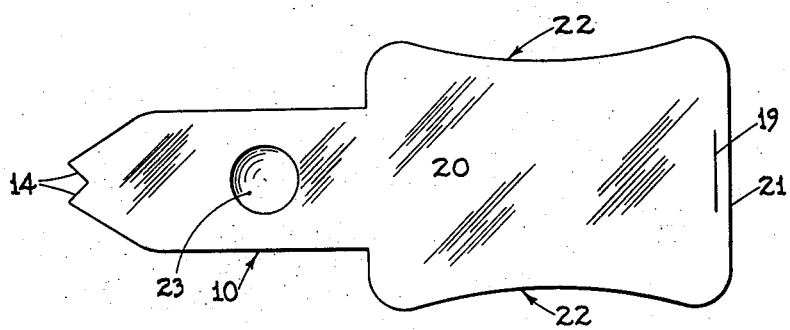
Inventor
E. W. Ashton
By Glascock Downing Seebold
Attys.

Patented Sept. 23, 1952

2,611,200

UNITED STATES PATENT OFFICE 2,611,200

POULTRY TAG

Ernest Ward Ashton, Ottawa, Ontario, Canada, assignor, by mesne assignments, to Stoffel Seals Corporation, Tuckahoe, N. Y., a corporation of New York Application April 21, 1950, Serial No. 157,233

7 Claims. (Cl. 40—3)

1

The present invention relates to poultry-tags, particularly poultry-tags that may be attached to the breast of a graded bird.

The marking of graded chickens and turkeys and to a lesser extent, ducks and geese is the chief use to which poultry-tags are put and while tags must meet Government specifications a manufacturer must also consider the requirements of the distributor and the consumer. In the past wing-tags have been popular and quite satisfactory for certain purposes. They were variously constructed but usually were so made that they could be conveniently and securely clipped to the wing of a bird but were unsuitable for clipping to the breast. Recently however there has been a demand for a breast tag, that is to say, a tag that may be secured to the breast of a fowl carcass rather than to the wing. Wing tags are not satisfactory for that purpose for the reason that when secured to the breast they stand more or less erect whereas a satisfactory breast-tag should lie flat on the breast. Attempts to modify existing wing-tags failed to produce a satisfactory breast-tag but following a good deal of work and experimentation applicant has succeeded in making a breast-tag that is entirely suitable for all purposes and may be used with any type of bird. It is vastly superior to the wing-tag in that it does not pierce or otherwise damage the skin or flesh and when attached to a carcass it lies flat against the skin and is therefore satisfactory for display purposes and does not in any way constitute an encumbrance.

Further, the carcass of the fowl is often packaged in a transparent wrapper that is usually evacuated, taking the form of the carcass in covering it. With no sharp protuberance the improved poultry-tag does not damage this wrapper.

The invention consists in the construction, combination and arrangement of parts to be hereinafter described and more particularly pointed out in the appended claims. One embodiment of the invention will be described by way of example with reference to the accompanying drawings in which:

Figure 1 is an inverted plan view of the improved tag embodying the invention;

Figure 2 is a fragmentary inverted plan view showing an alternative tongue and lip construction;

Figure 3 is an inverted plan view showing an alternative tongue and lip construction;

Figures 4, 5 and 6 are side views showing the tag in progressive stages of being secured to the skin of poultry;

2

Figure 7 is a cross-section along the line 7—7 of Figure 1 and shows the tag closed and sealed in position.

Figure 8 is an inverted plan view showing an alternative tongue and lip construction.

Figure 9 is a plan view showing the shape of the metal blank from which the tag shown in Figure 8 is made.

Figure 10 is side elevation of Figure 8 and also showing an alternative side-wall construction.

The tag comprises an approximately rectangular, dished main portion 1 having curved end walls 2 and 3; curved side walls 4; preferably rounded corners 5 and a flattened top portion 6, these parts forming a unitary structure. An aperture 7 is formed in the end-wall 2 and extends into the top portion 6. The aperture 7 may be rectangular in shape and is formed by stamping or pressing and bending the metal downwardly and inwardly on one side as shown at 8 to form a lip 9. Integral with the end-wall 3 and extending therefrom in the direction of end-wall 2 and aperture 7 and lip 9 is a locking tongue 10 forming a toggle, of normally angular formation, one arm or base portion 11 of which normally diverges from the upper portion 1 and the other arm or tip portion 12 diverges from the base portion 11 when the tag is in the open position (see Figure 4). The free end of the part or tip portion 12 of the tongue 10 may be tapered as at 13 and serrated, to provide a number of pointed teeth 14 as shown in Figure 1. The tongue 10 itself can be pivoted or bent at the point indicated by numeral 15, it being at that point that the tongue 10 joins the main or body portion 1, the top surface of which bears the desired certification mark. The seal or tag can be conveniently made of sheet tin or coated steel about $12/1000$ of an inch in thickness.

A modification of the tongue, lip and aperture construction is shown in Figure 3 and may consist of dividing the tongue into two portions 12a with serrated ends 14. Two apertures 7a are formed in the end wall 2 as described with reference to aperture 7 in Figure 1, the apertures 7a being so positioned in the end-wall 2 that each of the tongues 12a may come into registration with one of the apertures 7a.

In order to secure one of the tags to the breast of a fowl it is merely necessary to bring the tag into contact with the skin as shown in Figure 4 and to squeeze the tag between the thumb and forefinger. The edge of the end-wall 2 rests on the skin of the fowl and a small section of skin indicated at 16 is engaged by the teeth 14 and forced toward the aperture 7 and lip 9. As the pressure of the thumb and forefinger is continued the toggle-shaped tongue 10 is gradually straightened as the angle between the parts 11 and 12 approaches 180°. Meanwhile the teeth 14 sliding forwardly towards the aperture 7 force the fold of skin 16 into contact with the top portion 6 and subsequently with the end-wall 2. The teeth 14 covered by the skin do not protrude beyond the end-wall 2 and for that reason will not damage a covering on the carcass. Continued pressure at this stage forces the locking tongue 10 to snap into the reverse angular position shown in Figure 7. In that position the tag is "locked" or sealed to the skin of the fowl carcass and may not be removed without damage to or destruction of the tag.

The lip 9 thus serves as an overlapping section to obtain further friction between the tag and the secured portion of the skin 16. In a modification of this lip shown in Figure 2 the free edge 17 of the lip, facing the serrated end of the tongue 10 and opposite to the point of attachment 8 between the end-wall 2 and the lip 9, is also serrated, the teeth being denoted by the numeral 18. This permits of additional friction between the skin and tag which further insures the firmness of grip of the tag on the carcass, there being two sets of points or teeth acting in opposite directions to grip the skin.

In a further modification of the lip construction as shown in Figures 8, 9 and 10, the lip 9a is formed as a result of the slitting and pressing operation. A horizontal slit 19 of suitable length is cut into the end-wall 2 portion of a blank 20 as shown in Figure 9. In the subsequent pressing operation to form the finished tag the strip of metal between said slit 19 and the free edge 21 of the side-wall 2 bends inwardly into an angular position as shown at 9a in Figures 8 and 10. In this modification it is not necessary to form a separate aperture; it is formed automatically as a result of the pressing operation.

A further modification is indicated in Figures 9 and 10 in which the side-walls 4 are cut away in curved fashion in the blank as shown at 22 in Figure 9. This results in the shape of side-walls shown in Figure 10. This construction besides saving material eliminates the hazard of having the thumb or finger lacerated by the free edges of the end-walls 4 in the tagging operation.

A still further modification is indicated in Figures 9 and 10 which show a depression or thumb-grip 23 situated in the part 11 of the locking-tongue 10. The presence of the thumb-grip 23 obviates any slipping of the thumb when pressure is being applied to a tag during the securing of the tag to a fowl carcass.

It will be understood that the invention is not limited to the shape of the parts shown in the drawings. The essential features are merely a body portion of any convenient shape bearing the certification mark and provided at one end with a lip and at the other end with an angularly bent tongue having a serrated free end so arranged and dimensioned that it can be readily manipulated to cause the fold of skin to be thrust between the body portion and a lip joined on the body portion, the tongue being meanwhile straightened.

The invention thus provides a seal or tag of extreme simplicity and effectiveness.

It can thus be seen that there has been provided according to the invention a closeable tag structure with a main portion 1 having opposite ends 2, 3, a tongue 10 joining one end 3 of said main portion 1 and terminating in a tip 14, said tongue 10 being bendable against said main portion 1 about an axis located adjacent the junction 15 of said tongue 10 with said main portion 1, the other end 2 of said main portion 1 being provided with a tongue engageable formation 9, said tongue including two sections 11, 12, one extending in angular relation to the other to thereby form a toggle, the distance from said junction to said tip 14 of said tongue on the one hand and the distance from said junction 15 to said engageable formation 9 on the other hand being so proportioned that when said tongue sections are swung about said axis against said main portion 1, the tip 14 of said tongue clears said formation 9 and upon subsequent bending of said toggle toward said main portion 1 said tip 14 of said tongue engages said tongue engageable formation 9, said tip 14 of said tongue and said engageable formation 9 being each toothed 14, 18 to produce a welt in a foldable material of an article to which said tag structure is to be applied, said welt upon closing of said tag structure being gathered between said tip 14 of said tongue and said tongue engageable formation 9.

The embodiments of the invention in which an exclusive property or privilege is claimed are defined as follows:

1. A metal tag for marking poultry comprising a dished main portion, a flexible, angularly-shaped tongue having a serrated free end carried by and substantially coextensive with said main portion, said main portion being provided with a centrally located aperture at one end thereof and a lip situated adjacent said aperture, said lip being bent inwardly from said main portion and being formed from a section of metal partially separated from said main portion to form said aperture, said serrated end being so positioned with respect to said aperture and said lip as to be capable of passing between the inner face of said dished portion and said lip when said tongue is bent towards said main portion, said dished portion and said tongue being so proportioned that said tongue serves to grip the skin of said poultry upon application of said tag.

2. A tag according to claim 1, wherein the lip portion has a serrated free end.

3. A sheet metal poultry tag comprising a body portion having a toggle-shaped tongue at one end, a plurality of apertures at the other end, and a lip adjacent each of said apertures, said tongue having a free end, said free end of said tongue being forked over a portion of its length to form a plurality of prongs, said tongue being normally arranged at an acute angle with respect to and below said lips and apertures and being of such length that on being bent toward said body portion each of the prongs on said tongue moves into a position above one of said lips and into registration with one of said apertures to be locked in said apertures after said toggle-shaped tongue is straightened out.

4. A tag as claimed in claim 3 wherein the lip is formed by an angular piece of metal extending inwardly from the front of the tag into the interior of said body portion.

5. A tag as claimed in claim 3, wherein a portion of said tongue is provided with a depression forming a thumb-grip.

6. A closable tag structure comprising a main portion having opposite ends, a tongue joining one end of said main portion and terminating in a tip, said tongue being bendable against said main portion about an axis located adjacent the junction of said tongue with said main portion, the other end of said main portion being provided with a tongue engageable formation, said tongue including two sections, one extending in angular relation to the other to thereby form a toggle, the distance from said junction to said tip of said tongue on the one hand and the distance from said junction to said engageable formation on the other hand being so proportioned that when said tongue sections are swung about said axis against said main portion, the tip of said tongue clears said tongue engageable formation and upon subsequent bending of said toggle toward said main portion said tip of said tongue engages said tongue engageable formation, said tip of said tongue and said engageable formation being each toothed to produce a welt in a foldable material of an article to which said tag structure is to be applied, said welt upon closing of said tag structure being gathered between said tip of said tongue and said tongue engageable formation.

7. A metal tag for marking poultry and closable from an open position, comprising a dished main portion and a bendable locking tongue extending from one end of said main portion, said portion being provided with an aperture and with a toothed lip adjacent another end of said main portion opposite said one end, said lip being struck out of said main portion to thereby produce said aperture, said tongue having two sections bent with respect to each other so as to form a toggle having a knee extending away from said dished main portion, said tongue terminating in a toothed tip positioned for engagement with said toothed lip when said tongue is bent against said main portion and straightened out so that said tongue sections are brought in alignment with each other, said main portion being sufficiently dished so that said tongue can be bent against said main portion with said knee reversed and positioned adjacent said main portion.

ERNEST WARD ASHTON.

REFERENCES CITED

The following references are of record in the file of this patent:

UNITED STATES PATENTS

| Number | Name | Date |
|---|---|---|
| 1,961,806 | Weiss | June 5, 1934 |
| 1,984,880 | Ker | Dec. 18, 1934 |
| 2,505,836 | Robbins | May 2, 1950 |